United States Patent [19]
Vandersall

[11] Patent Number: 4,839,065
[45] Date of Patent: Jun. 13, 1989

[54] FIRE RETARDANT CONCENTRATES AND METHODS FOR PREPARATION THEREOF

[75] Inventor: Howard L. Vandersall, Upland, Calif.

[73] Assignee: Monsanto Company, St. Louis, Mo.

[21] Appl. No.: 9,305

[22] Filed: Jan. 30, 1987

[51] Int. Cl.[4] ........................ C09K 21/00; C09D 5/16; C09D 5/18; A62D 1/00

[52] U.S. Cl. ................................ 252/603; 106/14.05; 106/18.14; 106/18.15; 106/18.16; 106/18.17; 106/18.31; 106/18.33; 169/45; 169/46; 252/2; 252/7; 252/601; 252/602; 252/607

[58] Field of Search .................. 252/2, 7, 8, 601, 602, 252/603, 607, 387, 315.3; 106/14.05, 15.05, 18.11, 18.14, 18.15, 18.16, 18.17, 18.31, 18.32, 18.33, 205; 169/45, 46; 536/114

[56] References Cited

U.S. PATENT DOCUMENTS

| | | | |
|---|---|---|---|
| 3,585,135 | 6/1971 | Smith et al. | 252/7 |
| 3,916,108 | 7/1965 | Nelson | 252/2 |
| 3,960,735 | 6/1976 | Lacey | 252/2 |
| 4,101,485 | 7/1978 | Brooks et al. | 252/603 |
| 4,176,071 | 11/1979 | Crouch | 252/2 |
| 4,226,727 | 10/1980 | Tarpley, Jr. et al. | 252/7 |
| 4,447,336 | 5/1984 | Vandersall | 252/7 |
| 4,447,337 | 5/1984 | Adl et al. | 252/7 |
| 4,606,831 | 8/1986 | Kegeler et al. | 252/7 |

FOREIGN PATENT DOCUMENTS

| | | | |
|---|---|---|---|
| 2724162 | 12/1977 | Fed. Rep. of Germany | 252/603 |
| 2921306 | 11/1979 | Fed. Rep. of Germany | 252/603 |

*Primary Examiner*—Howard J. Locker
*Attorney, Agent, or Firm*—W. Brooks

[57] ABSTRACT

The present invention is directed to an aqueous concentrate adapted to be diluted with water and used in fire control. The concentrate exhibits a viscosity of less than about 2000 centipoise and containing between about 0.75% and about 6% by weight a thickening agent and at least about 24% by weight of certain fire retardants, particularly diammonium phosphate, diammonium sulfate, a blend of diammonium phosphate and diammonium sulfate, a blend of monoammonium phosphate and diammonium phosphate having a nitrogen to phosphorus ratio of at least about 1.25, and a blend of monoammonium phosphate, diammonium sulfate and diammonium phosphate having a nitrogen to phosphorus ratio of at least about 1.25. Processes for the preparation of such concentrates and for use thereof are also disclosed.

4 Claims, No Drawings

FIRE RETARDANT CONCENTRATES AND METHODS FOR PREPARATION THEREOF

BACKGROUND OF THE INVENTION

This invention relates to chemical fire retardants and more particularly to concentrates adapted for dilution with water to produce long-term fire retardant solutions comprising such concentrates.

An important method for controlling wildland fires involves dropping an aqueous fire retardant solution from helicopter or fixed-wing aircraft onto timber or other foliage to form a chemical fire break in front of an oncoming fire. Fire retardant mixtures adapted for release from fixed-wing aircraft are desirably of relatively high viscosity, for example, about 1000 to 2000 centipoise, so that the mixture resists atomizing or spreading out to form a thin, discontinuous layer as it falls from the aircraft. However, a mixture exhibiting too high a viscosity is difficult to pump and may tend to form globules and so does not drop in fluid, continuous form to create an uninterrupted fire break. While the particular viscosity at which this occurs depends on the particular thickener incorporated in the mixture, it is typically preferred that the viscosity of the mixture be maintained below about 3000 centipoise, and more preferably below about 2000 centipoise. On the other hand, if the mixture is to be released by a helicopter, atomization of the fire control mixture is not as much of a problem because the helicopter may hover close to the target. Thus, fire retardant mixtures adapted for release from a helicopter typically are of a relatively low viscosity, generally about 50 to 250 centipoise.

Fire retardant mixtures employed in such fire control methods ordinarily comprise aqueous mixtures containing between about 5% and about 20% by weight, usually between about 10% and about 16% by weight, fire retardant. The retardant typically is a composition that produces phosphoric acid or sulfuric acid when heated. Common retardants are ammonium phosphate compositions and ammonium sulfate compositions such as monoammonium orthophosphate, diammonium orthophosphate, monoammonium pyrophosphate, diammonium pyrophosphate, triammonium pyrophosphate, tetraammonium pyrophosphate, ammonium polyphosphate, substituted ammonium polyphosphate, amide polyphosphate, melamine polyphosphate, ammonium-alkali metal mixed salts of orthophosphate, ammonium-alkali metal mixed salts of pyrophosphate, ammonium-alkali metal mixed salts of polyphosphate, ammonium-alkaline earth metal mixed salts of orthophosphate, ammonium-alkaline earth metal mixed salts of pyrophosphate, ammonium-alkaline earth metal mixed salts of polyphosphate, ammonium sulfate and blends thereof. So-called "liquid ammonium polyphosphates", as described in U.S. Pat. No. 3,730,890 (Nelson), are also commonly used as fire retardants. Such liquid ammonium polyphosphates are often used commercially as fertilizers and may be aqueous mixtures of ammonium ortho, pyro, and polyphosphate and, optionally, also metaphosphate. Typical formulations of such liquid ammonium polyphosphates contain 10% by weight nitrogen and 34% by weight phosphorus, or 11% by weight nitrogen and 37% by weight phosphorus.

Whereas fire suppressant mixtures rely solely on the water they contain to retard combustion, phosphate or sulfate containing fire retardant mixtures are useful for relatively long-term fire retardancy and include water primarily as a carrier for the fire retardant composition. Thus, long-term fire retardant mixtures continue to function even after the free water they contain evaporates. Long-term fire retardant mixtures are discussed in U.S. Pat. No. 4,145,296 (Fox et al.), U.S. Pat. No. 4,272,414 (Vandersall), U.S. Pat. 4,101,485 (Brooks et al.), U.S. Pat. No. 3,350,305 (Langguth et al.), U.S. Pat. No. 4,190,634 (Feiler), U.S. Pat. No. 3,558,486 (Morgenthaler), U.S. Pat. 3,364,149 (Morgenthaler), U.S. Pat. No. 3,342,749 (Handleman et al.), U.S. Pat. No. 3,338,829 (Langguth et al.), U.S. Pat. No. 3,309,324 (Langguth et al.), U.S. Pat. No. 3,293,189 (Morganthaler), U.S. Pat. No. 3,275,566 (Langguth), U.S. Pat. No. 3,257,316 (Langguth et al.), U.S. Pat. No. 3,223,649 (Langguth), U.S. Pat. No. 3,024,100 (Langguth et al.), U.S. Pat. No. 3,024,099 (Martinson) and U.S. Pat. No. 2,526,803 (Nielson).

When such aqueous long-term fire retardant mixtures are used to assist in gaining control of a fire, the retardant and the foliage coated by the retardant are heated. As an ammonium phosphate or ammonium sulfate retardant is heated, ammonia is released, leaving phosphoric or sulfuric acid on the cellulose of the foliage, whereupon a reaction is understood to take place and, as a by-product, water is given off as fire suppressing steam. Thus, the compositions which act as retardants are salts or other compounds that release phosphoric acid or sulfuric acid below the ignition temperature of cellulose. Aqueous fire retardant mixtures are frequently prepared by mixing a solid powder form fire retardant mixture with water. Such mixtures may also be prepared by diluting liquid ammonium phosphate with water.

Commonly, fire control mixtures further contain a gum thickener to modify the viscosity of the mixture. Low viscosity mixtures contain a relatively lower proportion of thickener than do high viscosity mixtures. Some typical gun thickeners are discussed in U.S. Pat. No. 3,634,234 (Morgenthaler), in U.S. Pat. No. 4,447,336 (Vandersall) and in U.S. Pat. No. 4,447,337 (Adl et al.). In addition, the mixture may contain corrosion inhibitors and flow conditioners. Aqueous fire retardant solutions are frequently prepared by mixing a solid powder form fire retardant composition with water. Typical flow conditions, which are added to the powder form of the fire control mixture to keep the mixture free-flowing, are tricalcium phosphate, magnesium carbonate, talc, sodium silicate and finely divided, colloidal silica. Optionally, the aqueous fire control mixture may also contain a colorant. The colorant may be a pigment such as iron oxide, which produces a red color, titanium dioxide pigment, which produces a white color, or an ultra-violet sensitive dye dispersed in biodegradable plastic.

Since the mixture, as used in fire control, comprises a relatively dilute solution or suspension of active ingredients and other auxiliary components in water, it is more economical to ship and store the fire control mixture in a relatively concentrated, lighter and less voluminous dry form, and to dilute the dry or liquid concentrate form on site or as needed. Further, because of the emergency nature of fire fighting, the frequent lack of manpower and the desirability of minimizing potential mechanical failure, it is frequently preferred to have a concentrated liquid retardant composition which can be merely diluted before use rather than a dry powder composition which must be mixed.

While certain suppliers have sold a thickener-free liquid concentrate of the fire retardant in water, use of the conventional concentrates has involved several drawbacks. For example, such products do not contain a thickening agent and may not include other desirable additives. Therefore, the thickener and other additives must be obtained, shipped, handled and stored separately from the concentrate or not used at all. Exclusion of thickener or other additives, of course, results in a less effective fire retardant solution. If obtained as individual components, the thickener and other additives are difficult to handle and careful metering is required to mix the thickener and other additives with the retardant solution. Thus, carefully trained personnel are needed. These are particularly serious drawbacks in view of essence of time during a fire emergency. While attempts have been made to prepare thickener-containing concentrates, it has been found in such attempts that mixing as little as 1% by weight thickener in water has produced an unmanageable, unpumpable solid. It has been found that the maximum concentration of thickener before development of such undesirable results depends on the particular thickener employed.

Thus, a need has existed for a liquid fire retardant concentrate that can be easily handled, without sacrificing effectiveness.

SUMMARY OF THE INVENTION

Among the several objects of the invention, therefore, may be noted the provision of a fire retardant concentrate that reduces shippping costs by avoiding transporting large quantities of water which can be obtained on site; the provision of such concentrate that is as easily handled as a water-like liquid; the provision of such concentrate that can be diluted accurately with simple equipment to a high viscosity, elastic gum thickened mixture of end use concentration; the provision of a method for preparing such concentrate; and the provision of a method for preparing a fire control retardant from such concentrate.

Briefly, therefore, the present invention is directed to a novel aqueous concentrate adapted to be diluted with water and used in fire control. The concentrate exhibits a viscosity of less than about 3000 centipoise and contains between about 0.75% and about 6% by weight thickening agent and at least about 24% by weight solids derived from a fire retardant selected from the group consisting of diammonium phosphate, diammonium sulfate, a blend of diammonium phosphate and diammonium sulfate, a blend of monoammonium phosphate and diammonium phosphate having a nitrogen to phosphorus ratio of at least about 1.25, a blend of monoammonium phosphate, diammonium sulfate and diammonium phosphate having a nitrogen to phosphorus ratio of at least about 1.25, and a blend of such fire retardant with polyammonium phosphate.

The present invention is also directed to a novel aqueous concentrate that is adapted to be diluted with water to produce an aqueous fire retardant mixture exhibiting a viscosity of between about 1000 centipoise and about 3000 centipoise and containing between about 5% and about 20% by weight fire retardant and between about 0.2% and about 3% by weight thickening agent. The characteristics of the fire retardant component are such that (a) the fire retardant releases phosphoric acid or sulfuric acid or both at a temperature below the ignition temperature of cellulose; and (b) mixing of one part by weight of the fire retardant component with between about 6 and about 20 parts by weight water and between about 0.02 and about 0.2 parts by weight thickening agent produces a mixture having a viscosity of between about 1000 and about 3000 centipoise; but (c) mixing of one part by weight of the same fire retardant component with less than about 4 parts by weight water and between about 0.02 and about 0.2 parts by weight thickening agent produces a mixture having a viscosity less than about 1000 centipoise.

The present invention is further directed to a novel aqueous concentrate that contains such fire retardant and is adapted to be diluted with water to produce a fire retardant mixture exhibiting a viscosity of between about 50 centipoise and about 250 centipoise and containing between about 5% and about 20% by weight fire retardant.

The present invention is also directed to a novel method for preparing an aqueous concentrate that is adapted to be diluted with water and used in fire control. The method comprises mixing a fire retardant composition with water to produce a concentrate exhibiting a viscosity of less than about 2000 centipoise and having a concentration of solids derived from the fire retardant composition of at least about 30% by weight of total concentrate, 40 parts by weight total fire retardant composition containing between about 1 and about 3 parts by weight of a thickening agent and between about 34 and about 38 parts by weight of a fire retardant. The characteristics of the fire retardant component are such that (a) the fire retardant releases phosphoric acid or sulfuric acid or both at a temperature below the ignition temperature of cellulose; and (b) mixing of one part by weight of the fire retardant component with between about 6 and about 20 parts by weight water and between about 0.02 and about 0.2 parts by weight thickening agent produces a mixture having a viscosity of between about 1000 and about 3000 centipoise; but (c) mixing of one part by weight of the same fire retardant with less than about 4 parts by weight water and between about 0.02 and about 0.2 parts by weight thickening agent produces a mixture having a viscosity less than about 1000 centipoise. The mixing is carried out in a manner such that the concentration of fire retardant composition in the aqueous phase remains above about 30% by weight during the entire mixing process.

The present invention is also directed to a novel method for preparing an aqueous concentrate that is adapted to be diluted with water and used in fire control, wherein the method comprises mixing a solid particulate fire retardant composition with water to produce a concentrate exhibiting a viscosity of less than about 2000 centipoise and a concentration of solids derived from the fire retardant composition of at least about 30% by weight of total concentrate, 40 parts by weight total fire retardant composition containing between about 1 and about 3 parts by weight of a thickening agent and between about 34 and about 38 parts by weight of a fire retardant. The fire retardant is selected from the group consisting of diammonium phosphate, diammonium sulfate, a blend of diammonium phosphate and diammonium sulfate, a blend of monoammonium phosphate and diammonium phosphate having a nitrogen to phosphorus ratio of at least about 1.25, a blend of monoammonium phosphate, diammonium sulfate and diammonium phosphate having a nitrogen to phosphorus ratio of at least about 1.25, and a blend of such fire retardant with polyammonium phosphate. In the method, mixing being carried out in a manner such that the concentration of fire retardant composition in the aqueous phase remains above about 30% by weight during the entire mixing process.

The present invention is also directed to a novel multiple step method for preparing an aqueous concentrate that is adapted to be diluted with water and used in fire control. In the method, first a solid particulate fire retardant is mixed with water to produce a retardant solution having a concentration of solids derived from the fire retardant of at least about 24% by weight of solution. The characteristics of the fire retardant component are such that (a) the fire retardant releases phosphoric acid or sulfuric acid or both at a temperature below the ignition temperature of cellulose; and (b) mixing of one part by weight of the fire retardant component with between about 6 and about 20 parts by weight water and between about 0.02 and about 0.2 parts by weight thickening agent produces a mixture having a viscosity of between about 1000 and about 3000 centipoise; but (c) mixing of one part by weight of the fire retardant component with less than about 4 parts by weight water and between about 0.02 and about 0.2 parts by weight thickening agent produces a mixture having a viscosity less than about 1000 centipoise. Thereafter, a composition comprising a thickening agent is mixed with the solution to produce a concentrate comprising at between about 0.75% and about 6% by weight thickening agent and exhibiting a viscosity of less than about 1000 centipoise.

The present invention is further drawn to such method wherein the fire retardant is selected from the group consisting of diammonium phosphate, diammonium sulfate, a blend of diammonium phosphate and diammonium sulfate, a blend of monoammonium phosphate and diammonium phosphate having a nitrogen to phosphorus ratio of at least about 1.25, a blend of monoammonium phosphate, diammonium sulfate and diammonium phosphate having a nitrogen to phosphorus ratio of at least about 1.25, and a blend of such fire retardant with polyammonium phosphate.

The present invention is also directed to methods of preparing fire retardant mixtures from such concentrates and to methods of controlling fires with such mixtures.

DESCRIPTION OF THE PREFERRED EMBODIMENTS

In accordance with the present invention, it has been discovered that an aqueous fire retardant concentrate can be prepared, having a moderate viscosity despite the presence of a thickener, by maintaining the concentration of fire retardant in the concentrate at a high level. More particularly, it has been found that, by maintaining the concentration of certain fire retardants above about 24% by weight, the viscosity of the concentrate is controlled at less than about 2000 cps, even in the presence of 6% and possibly as much as 50% by weight of a thickening agent.

Ordinarily, the viscosity of a mixture would be expected to increase with increasing concentration of thickener or other high-viscosity components. And, as expected, it has been found that increasing the concentration of fire retardant in an aqueous fire control mixture from about 10% to 20% by weight (while maintaining a constant thickener to retardant concentration ratio), increases the viscosity of the mixture. Surprisingly and seemingly inexplicable, however, it has been discovered that the concentrate of this invention, which has a fire retardant concentration of at least about 24% by weight and a thickener concentration of between about 0.75% and 6% by weight, not only has a viscosity that is not appreciably higher than that of the diluted mixture ultimately used in fire control, (5% to 10% by weight fire retardant and at most about 0.3% by weight thickener) but typically the concentrate has a much lower viscosity than the diluted mixture. Yet this phenomenon has been found not to be determined by the pH of the concentrate, and has been observed only for certain fire retardants. For example, if the fire retardant in the concentrate is monoammonium phosphate with an N/P ratio of less than 1.25, the viscosity of the concentrate is very high. However, if the retardant in a concentrate of the same pH is diammonium sulphate, the viscosity of the concentrate is relatively low. It has been found that the concentrate of this invention has a viscosity far below 2000 centipoise, typically below about 350 centipoise and often below about 50 centipoise.

Therefore, the concentrate of this invention avoids the pumping and handling problems that are encountered with mixtures of viscosities above about 2000 centipoise. In addition, the aqueous concentrate tends to disperse into mixture during dilution more readily than does powder. Accordingly, the concentrates of this invention require less meticulous metering of water than is required for ordinary powder concentrates. Also, since the concentrate includes thickener and, optionally, other additives, the only ingredients necessary on-site to produce a fire control retardant ready for application are the concentrate and water.

Generally, it has been discovered that addition of thickener to an aqueous mixture containing a relatively high concentration of certain fire retardants surprisingly produces a mixture of lower viscosity than mixtures containing substantially lower concentrations of retardant and thickener. It has been found that when the retardant concentration is maintained at a high level, added thickener does not act to significantly increase the viscosity of the mixture, but instead tends to settle in a sand-like form, remains suspended in a semi-colloidal form, or rises to the surface of the mixture. More particularly, it has been found that certain fire retardants produce mixtures exhibiting viscosities of between about 1000 and about 2000 centipoise when one part by weight of the fire retardant is mixed with between about 0.055 and about 0.2 parts by weight thickening agent and between about 6 and about 20 parts by weight water. Yet, these same retardants produce mixtures exhibiting viscosities below 1000 centipoise when one part by weight fire retardant is mixed with the same amount of thickening agent, but less than about 4 parts by weight water. This is a significant advantage in preparing and handling concentrates of high viscosity fire control retardants adapted for application by fixed-wing aircraft.

Similarly, the same phenomenon of decreased viscosity with increased thickener concentration has been observed when such fire retardants are incorporated in fire retardant solutions of relatively lower viscosity. The low viscosity mixtures are similar to the high viscosity mixtures adapted for delivery by fixed-wing aircraft. However, the lower viscosity mixtures contain lower levels of thickener. Thus, for the lower viscosity mixtures which are adapted for delivery by helicopter, the fire retardant produces a mixture exhibiting a viscosity between about 50 and about 250 centipoise when one part by weight of the fire retardant is mixed with between about 0.02 and about 0.075 parts by weight thickening agent and between about 6 and about 20 parts by weight water. However, the fire retardant produces a mixture exhibiting a viscosity below 50 centipoise when one part by weight fire retardant is mixed with the same amount of thickening agent, but less than about 4 parts by weight water. Clearly, therefore, this is a significant advantage in preparing and handling concentrates of high viscosity fire control retardants adapted for application by helicopter.

The fire retardants of the concentrates and fire control retardants of the invention are compounds or a mixture of compounds that degrade or decompose at temperatures below the ignition temperature of the fuels to be protected (e.g., cellulose), thereby releasing a mineral acid, such as phosphoric acid or sulfuric acid. Among the various fire retardants typically used in fire retardant mixtures and which might be used in the concentrate of this invention are monoammonium orthophosphate, diammonium orthophosphate, monoammonium pyrophosphate, diammonium pyrophosphate, triammonium pyrophosphate, tetraammonium pyrophosphate, ammonium polyphosphate, substituted ammonium polyphosphate, amide polyphosphate, melamine polyphosphate, ammonium-alkali metal mixed salts of orthophosphate, ammonium-alkali metal mixed salts of pyrophosphate, ammonium-alkali metal mixed salts of polyphosphate, ammonium-alkaline earth metal mixed salts of orthophosphate, ammonium-alkaline earth metal mixed salts of pyrophosphate, ammonium-alkaline earth metal mixed salts of polyphosphate, ammonium sulfate, liquid ammonium polyphosphates and blends thereof. While liquid ammonium polyphosphates are generally too dilute in their commercial forms for application as fire retardants, other retardants, such as those noted above, may be mixed with liquid ammonium polyphosphate until a minimum acceptable concentration is obtained. Ammonium polyphospohate is often called polyammonium phosphate, and commonly contains other ammonium phosphate such as pyroand metaphophates, and the alkali metal equivalents thereof, as well as a blend of phosphate polymers. Such polyammonium phosphates are often referred to as 10-34-0, 11-37-0, 12-40-0, 13-42-0 or the like, where the first number indicates the percentage of nitrogen in the blend, the middle number indicates the percentage phosphate in the blend and the last number indicates the percentage potash in the blend.

Specifically, it has been found that diammonium phosphate (DAP) and diammonium sulfate (DAS) may be employed as the fire retardant in the concentrates of this invention, but that use of a retardant comprising monoammonium phosphate (MAP) produces a concentrate of the above discussed desirable properites only if it is combined with another retardant, particularly DAP. No explanation has been discovered to explain why a concentrate containing MAP and no other fire retardant has a high viscosity, while use of DAP or DAS as the only fire retardant results in relatively low viscosity concentrates. Regardless, fire retardants in commerical use usually comprise a blend of some of the various fire retardants available. Typical commercial blends comprise MAP and DAP in ratios ranging from about 9:1 to about 1:9. One particular blend contains about 30 parts by weight DAS and about 9 parts by weight MAP per 1 part by weight DAP. It has been found, however, that for a MAP containing concentrate to have a viscosity below about 2000 centipoise, the concentrate should contain at least 0.3 mole DAP per mole of MAP. The MAP:DAP ratio tends to affect the pH of concentrates of this invention, with a concentrate of high MAP:DAP ratio having a pH of about 5.5 to 6, and a low MAP:DAP ratio concentrate having a pH near 8.

The fire retardants are commonly available in solid, particulate form but may also be obtained in a concentrated thickener-free aqueous solution requiring dilution with water and addition of thickener and other additives before application to wildland for fire control. The concentrated aqueous solution of commerce typically contains 34% to 42% by weight $P_2O_5$ (15% to 18% by weight phosphorus) in the form of ammonium ortho, pyro and polyphosphates, water and various impurities, but no thickening agent or other intended additive.

When solid, particulate retardant is to be incorporated in the concentrate of this invention, the retardant may first be mixed with water. In a separate step, a solid particulate premix comprising thickener and other additives, is mixed with the water with which the retardant was mixed. Thus, in this process, as will be discussed in more detail below, the solid, particulate fire retardant is added independently, and before the thickener. It is also possible to simultaneously add the thickener and retardant to water under agitation. Therefore, the solid, particulate form of fire retardant may be combined with the thickener and other additives to form a dry solid, particulate fire retardant composition for mixing with water. Such dry solid, particulate fire retardant composition may contain between about 85% and 95% by weight fire retardant, between about 2.5% and about 7.5% by weight gum thickener, between about 1% and about 5% by weight corrosion inhibitor, up to about 4% by weight color pigment and other functional components as desired.

The thickening agent of the composition of this invention may be any of a number of thickeners, including standard gum thickeners such as galatomannan guar gum compositions. The thickening agent is employed to maintain the viscosity of the diluted fire retardant solution, for example, at between about 1000 centipoise and about 2000 centipoise for aerial bombardment from fixed-wing aircraft, or between about 50 centipoise and about 250 centipoise for aerial bombardment from helicopter. The thickener should make up between about 0.75% and about 6% by weight of the concentrate. Since addition of thickener to the concentrate of this invention does not produce the expected thickening action, the thickener concentration in the concentrate can be even higher, but the specific concentration depends on the viscosity desired in the diluted mixture. Thus, the thickener concentration in the concentrate for fixed-wing aircraft applications should be between about 1.9% and about 6% by weight of the concentrate to produce an expanded mixture upon dilution exhibiting a viscosity of between about 1000 cps and about 2000 cps, and comprising about 0.8% or 0.9% by weight thickener. The thickener concentration in the concentrate for helicopter applications should be and between about 0.25% and about 2% by weight of the concentrate to produce an expanded mixture upon dilution exhibiting a viscosity of between about 50 cps and about 250 cps, and comprising between about about 0.28% and about 0.36% by weight thickener.

The composition of this invention may also contain a pigment such as iron oxide, which produces a red color, titanium dioxide pigment, which produces a white color, or a fugitive pigment which fades upon exposure to the elements. These colors aid a fire-fighting pilot by enabling the pilot to see where fire retardant solutions have already been dropped. On the other hand, for certain uses, particularly along roadsides or in parks, it may be preferable to exclude any colorant from the mixture. The concentrate would contain as much color pigment as would be required for visibility upon dilution. Thus, the amount of pigment depends on the degree of dilution contemplated.

Other ingredients commonly included in low concentrations in fire retardant mixtures are flow conditioners, such as tricalcium phosphate, magnesium carbonate, talc, sodium silicate and finely divided colloidal silica, added to keep the powder form of fire retardant composition free-flowing; and defoaming and antifoaming agents, such as polyalkylene derivatives of propylene glycol. Each of these additives may be present in minor amounts, about 0.3% to about 1.5% by weight, in the concentrate.

In addition, various impurities are often found in such concentrates and resulting fire retardant mixtures. Certain of these impurities, such as ferrous ions, are believed to result in variation of the viscosity of the concentrates of this invention over a storage period of days or months. In addition, the instability believed to be brought on by such impurities may be manifested in significantly lower viscosity of fire retardant mixtures prepared by diluting concentrates stored for several days or months. Consequently, it is desired to maintain the concentrations of these impurities to a minimum since concentrates contaminated with these impurities and stored for several months might not produce fire retardant mixtures of acceptable viscosity. Thus, if a concentrate is intended to be stored for long periods of time, it is preferred to use a fire retardant of essentially pure or technical grade as opposed to, for example, fertilizer grade.

The ferrous ions are believed sometimes to result from certain methods of production of the fire retardant, but also result from corrosion by certain fire retardant concentrates or mixtures of iron or steel holding tanks.

Since the ferrous ions are believed to impair the stability of the concentrates and fire control retardants made therefrom, when the concentrate or related mixtures are to be stored in iron or steel tanks, it is preferred that small amounts of corrosion inhibitors (usually less than about 0.1% by weight), such as sodium silicofluoride, dimercaptothiadiazole and/or sodium thiosulfate, be added to the concentrates of this invention to minimize the iron introduced into the concentrate from corrosion.

The water used in formation of the aqueous concentrate and in dilution of the concentrate may be tap water or water from other convenient water sources. Due to the potentially long periods of storage and the danger of bacteria growth supported by the gum thickener (which typically is a polysaccharide), it may be desirable that the water be substantially bateria-free. Accordingly, it may be desirable to add a bacteriocide, such as sodium silicofluoride in a proportion of about 0.90% by weight sodium silicofluoride in the concentrate. The bacteriocide may be added to the water either before, after or simultaneously with incorporation of the fire retardant and thickener. However, the aqueous mixtures of this invention tend to have high ionic strength, so it is believed that use of bacteria-free water or a bacteriocide is not always necessary.

Thus, the aqueous concentrate of this invention contains at least about 25% and as much as about 75% by weight fire retardant, between about 0.75% and about 6% by weight thickening agent, minor amounts of other additives as discussed above, and exhibits a viscosity below about 2000 centipoise. When a fire retardant solution for helicopter delivery is prepared by diluting a concentrate of appropriate composition with enough water to lower the concentration of the fire retardant to between about 5% and 20% by weight of the mixture, the mixture obtained exhibits a viscosity between about 50 centipoise and about 250 centipoise. When a fire control retardant for fixed-wing aircraft delivery is prepared in a comparable manner, the mixture obtained exhibits a viscosity between about 1000 centipoise and about 200 centipoise.

The aqueous concentrate of this invention should be prepared by mixing fire retardant with water in a manner such that the fire retardant concentration in the mixture does not fall below about 24% by weight during incorporation of the thickening agent into the concentrate. Thus, the thickener should not be added before the retardant, since it has been found that retardant-free mixtures which contain even 1.5% by weight thickener exhibit unmanageably high viscosity. Moreover, once such viscosity is produced, the low viscosity concentrates of this invention cannot be formed from the mixture even by adding large amounts of fire retardant. Similarly, even fire retardant mixtures in which the fire retardant concentration is in a somewhat moderate range of between about 15% and about 23% by weight, exhibit very high viscosities, rendering the mixtures difficult to handle and to pump. It has been found that, once a relatively high viscosity is reached in the process of preparing the concentrate, increasing the concentration of additives to the levels of the concentrates of this invention is not effective for reducing the viscosity to the low ranges achievable if the desired cocentrations are maintained throughout the mixing process. Thus, it is not feasible even to premix thickener with water and then add that premixture to a high fire retardant/water mixture. Such premixture would be a thick paste or solid if the premixture contained a high enough thickener concentrate so that a proper resulting thickener concentration is reached upon dilution of the premix with retardant/water mixture. The viscosity does not decrease to a satisfactory level upon addition to the fire retardant/water mixture.

Several techniques may be used to maintain the concentration above 24% throughout the addition of thickener, and optionally throughout the mixing process. In a preferred method, the fire retardant is first mixed with water to a concentration of a least 24%, after which the thickener is added to the fire retardant and water mixture. However, if so desired, thickener and fire retardant may be mixed with water simultaneously and quickly and with agitation. Due to the higher dissolution rate of the retardant, it tends to dissolve in water more quickly than the thickener and it has been found that the overly high viscosity is avoided. According to this method, the water may be added to a fire retardant composition comprising fire retardant and thickener, or such fire retardant composition and water may be introduced simultaneously to a mixing chamber. However, slow addition of fire retardant composition to a large volume of water results, at some point during the mixng process, in a retardant composition concentration which exhibits an inconveniently high viscosity.

The preferred techniques, particularly when carried out with agitation of the mixture, avoid not only the high viscosity range of fire retardant concentration, but also such problems as the formation of clumps in the mixture. Thus, in practice, the concentrate may be prepared by mixing dry solid, particulate fire retardant with water until the desired concentration is reached, and then mixing the resulting retardant solution with a "premix" comprising thickener and other additives. Similarly, a very highly concentrated thickener-free aqueous retardant solution may be mixed with premix. If the resultant fire retardant concentration is higher than desired in the concentrate, water may be added to achieve the proper retardant concentration for the concentrate of this invention.

The concentrate of this invention can be stored in a tank near the site of potential wildland fires. The tank may be equipped either with a small pump to recirculate the concentrate or with a slow agitator to maintain the homogeneity of the concentrate. Another method of maintaining the homogeneity might be to thicken the concentrate by adding a relatively small amount of a second thickener that would be more effective in the concentrate than the original thickener. Or, if desired, the concentrate may be diluted well in advance of any fire to form the expanded fire control retardant. The mixture may then be stored in its expanded form. Upon dilution of the concentrate, the fire retardant solution as employed in control of fire ordinarily contains between about 5% and about 20% by weight fire retardant and between about 0.2% and about 3.0% by weight thickener.

Any of a number of techniques may be used to expand the concentrate for use as a fire control retardant. For example, the concentrate may be diluted in a holding tank. Alternatively, the concentrate and water may be introduced from separate feed lines into a common conduit wherein mixing takes place. Advantageously, the resultant fire retardant solution may be discharged directly from the mixing conduit into a delivery tank inside the delivery vehicle. Regardless of the method of expanding the concentrate, it has been found that less meticulous metering of ingredients is necessary than in the conventional process of diluting a powdered fire retardant composition directly to a full volume fire retardant solution. However, to ensure and preserve homogeneity, it has been found that either some degree of agitation or circulation of the concentrate before the dilution process or some degree of agitation or circulation of the expanding mixture during the dilution process is desired.

Other advantages derived from the practice of this invention will become apparent from the following description and examples:

EXAMPLE 1

A sample of typical commercially available low viscosity, diammonium phosphate (DAP) based fire retardant concentrate (retardant composition with relatively low thickener concentration useful for dilution with water to produce a helicopter deliverable fire retardant solution) of viscosity between about 50 cps and about 250 cps was mixed with water to form a 16.1% by weight mixture. The viscosity of the mixture was measured and found to be 70 centipoise (cps). Another sample of the same low viscosity, high proportion DAP fire retardant composition was mixed with water to form a 40% by weight concentrate. The viscosity of the solution measured 10 minutes after mixing of this concentrate was measured with a Brookfield viscometer operating at 60 rpm and was found to be about 22 cps. A portion of the concentrate was then diluted with tap water to form a mixture comprising 16.1% by weight solids derived from the composition. The 10 minute viscosity of this mixture was found to be about 112 cps. The viscosity of the remaining concentrate remained 22 cps when measured at a later time.

EXAMPLE 2

Nine samples (labeled a through i) of various weights of high viscosity, dry, high proportion DAP fire retardant composition were measured and each sample was added rapdily to water (each sample added to 350 ml) with rapid agitation. The resulting mixtures were stirred for five minutes after addition of the samples. The mixture then sat undisturbed for five minutes. The viscosity of each mixture was then determined with a Brookfield viscometer operating at 60 rpm using a No. 4 spindle.

Three more mixtures were prepared as above, but instead of the high viscosity, high proportion DAP fire retardant composition, the following compositions were used. For mixture j, the composition comprised the following:

(1) monoammonium phosphate (N/P ratio of 1.0 to 1.05) (204.6 gm)
(2) gum thickener (hydroxypropyl guar gum derivative) (18.1 gm)
(3) premix (10.6 gm) containing by weight: 44.4% tricalcium phosphate 6.7% mercaptobenzothiazole 4.4% sodium molybdate 22.2% iron oxide 22.3% thiourea For mixture 1, the composition comprised the following:

(1) monoammonium phosphate (N/P ratio of 1.0 to 1.05) (306.95 gm)
(2) hydroxypropyl guar derivative (27.1 gm)
(3) premix (15.9 gm) of the above proportions.

For mixture k, the composition comprised the following:

(1) diammonium sulfate (306.95 gm)
(2) hydroxypropyl guar derivative (27.1 gm)
(3) premix (15.9 gm) of the above proportions The following results were obtained:

| Sample | Concentration of dry composition (% by weight) | Weight of dry composition (gm. in 350 ml) | 10 min. viscosity (cps) |
|---|---|---|---|
| a (DAP) | 12.0 | 47.9 | 1863 |
| b (DAP) | 13.1 | 52.7 | 2040 |
| c (DAP) | 17.0 | 71.8 | 4203 |
| d (DAP) | 25.5 | 119.8 | 8473 |
| e (DAP) | 30.0 | 150.0 | 350 |
| f (DAP) | 40.0 | 233.3 | 113 |
| g (DAP) | 50.0 | 350.0 | less than 50 |
| h (DAP) | 60.0 | 525.0 | less than 50 |
| i (DAP) | 70.0 | 816.7 | 167 |
| j (MAP) | 40.0 | 233.3 | above 10,000 |
| k (MAP) | 50.0 | 350.0 | could not mix |
| l (DAS) | 50.0 | 350.0 | about 100 |

EXAMPLE 3

The mixtures of Example 2 were stored in tightly capped jars for about forty hours. Then a sample of each mixture was diluted with some agitation to a 12% solution as might be used in fire control. The viscosity of each diluted mixture was measured by the procedure of Example 1 with the following results (the 40 hr. visc. is the viscosity of the mixture before dilution to a 12% solution, but after sitting for forty hours; the 10 min. visc, is the viscosity ten minutes after dilution; and the 2 hr. visc. is the viscosity two hours after dilution):

| Sample | Sample mixture wgt. (gm) | Diluting water wgt. (gm.) | 40 hr. visc. (cps) | 10 min. visc. (cps) | 2 hr. visc. (cps) |
|---|---|---|---|---|---|
| a (DAP) | | | 1760 | | |
| b (DAP) | 201.4 | 17.5 | 2050 | 1575 | 1567 |
| c (DAP) | 210.9 | 87.3 | 4346 | 1617 | 1637 |
| d (DAP) | 187.8 | 210.1 | 9590 | 1547 | 1527 |
| e (DAP) | 159.7 | 238.2 | 1307 | 1587 | 1635 |
| f (DAP) | 119.8 | 278.1 | 120 | 1718 | 1783 |
| g (DAP) | 95.8 | 302.1 | below 50 | 1925 | 2010 |
| h (DAP) | 79.8 | 318.1 | below 50 | 1975 | 2032 |
| i (DAP) | 68.4 | 329.5 | below 50 | 2937 | 3060 |
| j (MAP) | | | solid | | |
| k (MAP) | | | solid | | |
| l (DAS) | 95.8 | 302.1 | below 50 | 2377 | 2415 |

Sample i was rerun with the dilution performed without agitation. The concentrate was stirred into water and the resulting mixture sat for ten minutes. The viscosity ten minutes after dilution was found to be 1847 cps, and the viscosity two hours after dilution was found to be 2040 cps. Sample i was again rerun with the dilution performed with agitation. The viscosity ten minutes after dilution was found to be 1718 cps, and the viscosity two hours after dilution was found to be 1833 cps.

EXAMPLE 4

Four fire control concentrates, A, B, C and D, were prepared. Concentrate A was prepared by dissolving dry powder MAP (1047.5 lbs.) and dry powder DAP (698.5 lbs.) in water (2660 lbs.) and then adding a blended dry premix (254.0 lbs.) consisting of by weight of total premix:

57.2% colloid thickener (a polysaccharide guar gum)
16.4% tricalcium phosphate
2.3% mercaptobenzothiazole
1.5% sodium molybdate
5.7% dimercaptothiadiazole
3.7% sodium silicofluoride
12.1% fugitive color
1% polyalkylene derivatives of propylene glycol Concentrate B was prepared in the same manner, except that less water (2283 lbs. as opposed to 2660 lbs.) was used.

Concentrate C was prepared by dissolving dry powder MAP (1069.6 lbs.) and dry powder DAP (713.5 lbs.) in water (2760 lbs.) and then adding a blended dry premix (217.0 lbs.) consisting of by weight:

68.5% colloid thickener
2.8% mercaptobenzothiazole
1.8% sodium molybdate
6.8% dimercaptothiadiazole
4.4% sodium silicofluoride
14.5% fugitive color
1.4% polyalkylene derivatives of propylene glycol Concentrate D was prepared in the same manner, except that less water (2375 lbs. as opposed to 2760 lbs.) was used.

The concentrates were stirred or shaken to increase the homogeneity, and an aliquot sample was withdrawn from each concentrate. Under agitation, each sample was then diluted with water in the following ratios in pounds of concentrate per pound of water: for A, 3.00; for B, 3.35; for C, 2.99; and for D, 3.34. The composition of the concentrates and the diluted mixtures are shown in the following tables and compared to the corresponding exemplary requirements set forth by the government of Italy:

| | ITALY | A | B | C | D |
|---|---|---|---|---|---|
| Concentrates | | | | | |
| Phosphate Content (% wgt) | min. 21.6 | 21.6 | 23.5 | 21.6 | 23.5 |
| Viscosity (cps at 20° C.) | max. 2000 | 19 | 22 | 20 | 22 |
| Viscosity (cps at 5° C.) | max. 2000 | 24 | 26 | 24 | 25 |
| Density (gm/cm$^3$) | 1.15–1.35 | 1.25 | 1.26 | 1.24 | 1.26 |
| Iron oxide (% wgt) | 0.4–0.8 | 0 | 0 | 0 | 0 |
| Pouring Time (% at 40° C.) | min. 97 | — | 99.5 | — | 99.6 |
| Pouring Time (% at 5° C.) | min. 95 | — | 98.5 | — | 98.9 |
| Diluted Mixtures | | | | | |
| Phosphate Content (% wgt) | min. 5.4 | 5.4 | 5.4 | 5.4 | 5.4 |
| Viscosity (cps at 20° C.) | 1000–2000 | 1606 | 1563 | 1580 | 1581 |
| Viscosity (cps at 5° C.) | — | Pass | Pass | Pass | Pass |
| Density (gm/cm$^3$) | 1.05–1.10 | 1.06 | 1.06 | 1.06 | 1.06 |
| Solution pH | 6.0–8.0 | 6.0 | 6.0 | 6.0 | 6.0 |
| Stability at 20° C. | * | Pass | Pass | Pass | Pass |

*Appearance only; absence of crystals or visible separation in 48 hours.

The viscosity stability of the concentrates was also measured. Each of the concentrates were separated into samples, one sample stored at 40° F., one at 72° F. and one at 90° F. The 10 minute viscosity was measured with a number two spindle at various times and the results are shown in the following table:

| Conc. | Temp. | Viscosity (in cps) after storage for: 10 min. | 24 hrs. | 7 days | 30 days | 150 days |
|---|---|---|---|---|---|---|
| A | 41 | 24 | 25 | 25 | 24 | 26 |
| A | 72 | 24 | 31 | 19 | 19 | 19 |
| A | 90 | 24 | 18 | 19 | 22 | 22 |
| B | 41 | 27 | 29 | 25 | 26 | 28 |
| B | 72 | 27 | 31 | 20 | 22 | 22 |
| B | 90 | 27 | 20 | 20 | 20 | 20 |
| C | 41 | 25 | 28 | 22 | 24 | 27 |
| C | 72 | 25 | 20 | 18 | 20 | 20 |
| C | 90 | 25 | 18 | 19 | 18 | 18 |
| D | 41 | 25 | 27 | 25 | 25 | 27 |
| D | 72 | 25 | 20 | 19 | 22 | 21 |
| D | 90 | 25 | 20 | 19 | 17 | 17 |

Samples of concentrates B and D were stored at 74° F. for various lengths of time and then were diluted to fire control application strength. The viscosities measured for these mixtures and the percentage of viscosity lost from that found for the mixture made from concentrate stored only 10 minutes were as follows:

| | From Concentrate B | | From Concentrate D | |
|---|---|---|---|---|
| Storage Time | Viscosity (cps) | % Lost | Viscosity (cps) | % Lost |
| 10 min. | 1606 | — | 1616 | — |
| 27 days | 1563 | 3 | 1450 | 10 |
| 42 days | 1580 | 2 | 1640 | gain 1 |
| 150 days | 1581 | 2 | 1403 | 13 |
| 150 days (repeat) | 1431 | 11 | 1442 | 11 |

EXAMPLE 5

Concentrated thickener-free, high DAP concentration fire retardant solution was obtained and analyzed. The solution was of low quality grade (i.e., high concentration of impurities), cloudy and yellowish, had a pH of 6.95, a phosphate (in the form of $P_2O_5$) concentration of 19.71% by weight and a ferrous ion content of 0.070% by weight. Hydroxypropyl guar thickener (6 gm.) was added to a sample (200 gm.) of the solution to produce a suspension exhibiting a viscosity of 40 centipoise. Dilution of the suspension by addition of enough water to lower the phosphate ion concentration to 5.46% by weight produced a thickened mixture, but the results were not consistenly reproducible. It is believed that the inconsistent results are attributable to inadequate thickener dispersion. In addition, it was found that the viscosity of the diluted mixture dropped from 1000 or 1500 cps to 100 or 200 cps within a few days. It is believed that this viscosity instability is caused by the high ferrous ion content of the thickener-free solution sample.

A second sample (97.3 gm.) of the low quality grade thickener-free solution was mixed with water (247.6 gm.) and a premix comprising gum thickener (3.165 gm.), sodium silicofluoride (0.95 gm.), sodium thiosulfate (0.316 gm.), mercaptobenzothiazole (0.127 gm.), fugitive color (0.675 gm.), tricalcium phosphate (0.844 gm.) and antifoaming agent (0.063 gm.) to form Mixture 1. Another sample was neutralized by adding aqueous ammonia (about 1.4% by weight) to increase the pH to 7.9. The neutralized sample (100 gm.) was mixed with water (244.9 gm.) and the same amount of premix as used to make Mixture 1. The resulting mixture was labeled Mixture 2. The viscosities of the two mixtures were measured with Brookfield Viscometer Model LVF at 60 rpm and spindle number 4 at various times after dilution and the results were as follows:

| | Viscosity (cps) of: | |
|---|---|---|
| Time after dilution | Mixture 1 | Mixture 2 |
| 10 minutes | 1633 | 1480 |
| 1 day | 1570 | 1570 |
| 2 days | 1300 | 1523 |
| 7 days | 670 | 1380 |
| 16 days | 270 | 1203 |

Thus, it appears that neutralization may reduce the observed instability.

Two more samples, A and B, of the thickener-free fire retardant solution were obtained. The pH of one sample, Sample A, was increased to 8.0 by bubbling anhydrous $NH_3$ into the liquid with agitation. Each sample was mixed with a premix to form a sample containing the fire retardant solution (94.84% by weight), gum thickener (3.09% by weight), sodium silicofluoride (0.93% by weight), sodium thiosulfate (0.31% by weight), mercaptobenzothiazole (0.12% by weight), fugitive color (0.66% by weight) and antifoam (0.05% by weight). Sample A was separated into Samples A-1, A-2 and A-3. To Sample A-2 was added $Na_4Fe(CN)_6$ to produce a concentrate containing 1.41% by weight $Na_4FE(CN)_6$. To Sample A-3 was added $Na_4FE(CN)_6$ to produce a concentrate containing 4.23% by weight $Na_4FE(CN)_6$. The viscosity of the concentrates was measured periodically. The results are shown in the following table:

| | Viscosity (cps) | | | |
|---|---|---|---|---|
| Time after prep'n | A-1 | A-2 | A-3 | B |
| 10 minutes | 53 | 53 | 53 | 53 |
| 3 days | 50 | 47 | 50 | 50 |
| 11 days | 97 | 100 | 97 | 67 |

The pH of each sample was measured after 12 days. All Sample A concentrates had a pH of 7.5, while the Sample B concentrate had a pH of 6.95.

Samples from each of the concentrates were obtained periodically after preparation of the concentrates. These samples were diluted and the 10 minute viscosity measured. The results were as follows:

| | Viscosity (cps) | | | |
|---|---|---|---|---|
| Length of Conc. Storage | A-1 | A-2 | A-3 | B |
| 0.5 hour | 1890 | 1373 | 1400 | 1503 |
| 3 days | 1833 | 1407 | 1300 | 1430 |
| 11 days | 1763 | 1367 | 1327 | 1327 |
| % of viscosity lost: | 6.7 | 0.4 | 5.2 | 11.7 |

When the diluted solutions were stored for 12 days, it was found that the diluted solution from Sample A-1 lost 14.3% of its viscosity, the diluted solution from Sample A-2 lost 10.4% of its viscosity, the diluted solution from Sample A-3 gained 6.2% of its viscosity, and the diluted solution from Sample B lost 70.6% of its viscosity.

EXAMPLE 6

In experiments conducted to investigate methods of ameliorating the effects of the impurities in the thickener-free fire retardant concentrates, a sample (10 quart) of the low quality grade thickenerfree concentrate as described in Example 5 was divided into 19 aliquots (418.9 gm. each). Some of the aliquots were treated with ammonium hydroxide until a desired pH was obtained. Hydrogen peroxide (71.7 ml. of 3% solution) was added to some of the aliquots, and the aliquots left to set for one hour. Distilled water was added to all the aliquots to increase the total weight of each aliquot to 475.4 grams. Then premix (24.3 g,.), containing thickener (15.00 gm.), fugitive color 2.70 gm.), mercaptobenzothiazole (0.60 gm.), sodium silicofluoride (4.50 gm.) and sodium thiosulfate (1.50 gm.) plus other additives as shown in the tables below, and polyalkylene derivative of propylene glycol were added to each aliquot. After mixing, the 10 minute viscosity of each aliquot was measured. Then, the aliquots were homogenized by agitation and a portion (120 gm.) of each aliquot was removed and stored. Five minutes after the viscosity measurement, distilled water (276.9 gm.) was added to each aliquot and the 10 minute viscosity of the diluted aliquots was measured. The stored aliquot portions as well as the diluted aliquots were monitored for viscosity stability. Periodically, samples of the stored aliquot portions were diluted and the 10 minute viscosities measured. The results are shown in tables I, II and III.

TABLE I

| | Additives (% in solution) | | | | | | Viscosity of Concentrate After: | | | | |
|---|---|---|---|---|---|---|---|---|---|---|---|
| I.D. # | Sodium Molybdate | Thiourea | Sodium Ferrocyanide | Hydrogen Peroxide | $NH_3$ to change pH | pH of Final Liquor | 10 Minutes | 7 Days | 31 Days | 45 Days | 60 Days |
| 1 | 0 | 0 | 0 | 0 | No | 6.4 | 47 | 40 | 40 | — | 47 |
| 2 | 0 | 0 | 0 | 0 | Yes | 6.8 | 90 | 77 | 60 | — | 70 |
| 3 | 0 | 0 | 0 | 0 | Yes | 7.0 | 60 | 97 | 20 | — | 67 |
| 4 | 0 | 0 | 0 | 0 | Yes | 7.2 | 100 | 123 | 60 | — | 60 |
| 5 | 0 | 0 | 0 | 0 | Yes | 7.5 | 120 | 140 | 90 | — | 80 |
| 6 | 0.06 | 0.31 | 0 | 0 | No | 6.4 | 40 | 30 | 30 | 80 | — |
| 7 | 0.06 | 0.31 | 0 | 0 | Yes | 7.0 | 60 | 100 | 60 | 90 | — |
| 8 | 0 | 0.06 | 0 | 0 | Yes | 7.0 | 50 | 103 | 80 | — | 103 |
| 9 | 0 | 0.12 | 0 | 0 | Yes | 7.0 | 50 | 117 | 60 | — | 103 |
| 10 | 0 | 0.25 | 0 | 0 | Yes | 7.0 | 95 | 107 | 90 | — | 53 |
| 11 | 0 | 0.50 | 0 | 0 | Yes | 7.0 | 80 | — | 60 | — | 57 |
| 12 | 0 | 0 | 0.06 | 0 | Yes | 7.0 | 75 | 110 | 75 | — | 80 |
| 13 | 0 | 0 | 0.12 | 0 | Yes | 7.0 | 60 | 110 | 60 | — | 100 |
| 14 | 0 | 0 | 0.25 | 0 | Yes | 7.0 | 70 | 83 | 45 | — | 57 |
| 15 | 0 | 0 | 0 | 0.25 | No | 6.4 | 75 | 30 | — | — | — |
| 16 | 0 | 0 | 0 | 0.25 | Yes | 7.0 | 110 | 80 | — | — | — |
| 17 | 0 | 0.12 | 0 | 0.25 | Yes | 7.0 | 175 | 60 | — | — | — |
| 18 | 0 | 0 | 0.12 | 0.25 | Yes | 7.0 | 50 | 90 | — | — | — |
| 19 | Same as #1 except Galactosol 211 is used as thickener instead of E9 | | | | No | 6.4 | 50 | 107 | 60 | — | 70 |

TABLE II

| | Additives (% in solution) | | | | | | Viscosity of: | | | | | | Percent Change | | | |
|---|---|---|---|---|---|---|---|---|---|---|---|---|---|---|---|---|
| | | | | | | | | Diluted Solution, Dilution after: | | | | | | | | |
| I.D. # | Sodium Molybdate | Thiourea | Sodium Ferrocyanide | Hydrogen Peroxide | NH to change pH | pH of final Liquor | Initial Concentrate | Zero Time | 7 Days | 31 Days | 45 Days | 60 Days | Zero to 7 Days | 7 Days to 31 Days | 31 Days to Final | Zero to Final |
| 1 | 0 | 0 | 0 | 0 | No | 6.4 | 47 | 1637 | 1413 | 967 | — | 600 | −14 | −32 | −38 | −63 |
| 2 | 0 | 0 | 0 | 0 | Yes | 6.8 | 90 | 1637 | 1500 | 1316 | — | 897 | −8 | −12 | −32 | −45 |
| 3 | 0 | 0 | 0 | 0 | Yes | 7.0 | 60 | 1637 | 1440 | 1297 | — | 900 | −12 | −10 | −31 | −45 |
| 4 | 0 | 0 | 0 | 0 | Yes | 7.2 | 100 | 1637 | 1417 | 1117 | — | 823 | −13 | −21 | −26 | −50 |
| 5 | 0 | 0 | 0 | 0 | Yes | 7.5 | 120 | 1637 | 1320 | 1095 | — | 873 | −19 | −17 | −20 | −47 |
| 6 | 0.06 | 0.31 | 0 | 0 | No | 6.4 | 40 | 1637 | 1440 | 1348 | 997 | — | −12 | −6 | −26 | −39 |
| 7 | 0.06 | 0.31 | 0 | 0 | Yes | 7.0 | 60 | 1637 | 1447 | 1380 | 827 | — | −12 | −5 | −41 | −49 |
| 8 | 0 | 0.06 | 0 | 0 | Yes | 7.0 | 50 | 1637 | 1113 | 880 | — | 700 | −32 | −21 | −20 | −57 |
| 9 | 0 | 0.12 | 0 | 0 | Yes | 7.0 | 50 | 1637 | 1187 | 990 | — | 690 | −27 | −17 | −30 | −58 |
| 10 | 0 | 0.25 | 0 | 0 | Yes | 7.0 | 95 | 1637 | 1060 | 890 | — | 653 | −35 | −16 | −28 | −61 |
| 11 | 0 | 0.50 | 0 | 0 | Yes | 7.0 | 80 | 1637 | — | 1250 | — | 973 | — | — | −22 | −41 |
| 12 | 0 | 0 | 0.06 | 0 | Yes | 7.0 | 75 | 1637 | 1310 | 977 | — | 807 | −20 | −25 | −17 | −51 |
| 13 | 0 | 0 | 0.12 | 0 | Yes | 7.0 | 60 | 1637 | 1490 | 1238 | — | 890 | −9 | −17 | −28 | −46 |
| 14 | 0 | 0 | 0.25 | 0 | Yes | 7.0 | 70 | 1637 | 1280 | 1128 | — | 1010 | −22 | −12 | −10 | −38 |
| 15 | 0 | 0 | 0 | 0.25 | No | 6.4 | 75 | 1637 | 276 | — | — | — | −83 | — | — | — |
| 16 | 0 | 0 | 0 | 0.25 | Yes | 7.0 | 110 | 1637 | 688 | — | — | — | −58 | — | — | — |
| 17 | 0 | 0.12 | 0 | 0.25 | Yes | 7.0 | 175 | 1637 | 823 | — | — | — | −50 | — | — | — |
| 18 | 0 | 0 | 0.12 | 0.25 | Yes | 7.0 | 50 | 1637 | 940 | — | — | — | −43 | — | — | — |
| 19 | same as #1 except Galactosol 211 is used as thickener instead of E9 | | | | | 6.4 | 50 | 1637 | 1073 | 898 | — | 633 | +13 | −16 | −30 | −34 |

Viscosity is measured with Brookfield Viscometer LVF with Spindle #4 @ 74° F.
Dilution of LC is 80 gms LC + 186.1 gms distilled $H_2O$ which results in a solution equivalent to XAF in concentration.

TABLE III

| | | | | | | | Viscosity Stability of the Diluted Solutions for Which the Dilutions Were After 7 Days | | | | | Viscosity Stability of the 31 Day Dilutions | | | | |
|---|---|---|---|---|---|---|---|---|---|---|---|---|---|---|---|---|
| | | | | | | | Viscosity (in cps): | | | Percent Change 10 Minutes to: | | Viscosity (in cps): | | | Percent Change 10 Minutes to: | |
| I.D. # | Sodium Molybdate | Thiourea | Sodium Ferrocyanide | NH to change pH | pH of Final Solution | Initial Viscosity | 10 Minutes | 24 Hours | 3 Days | 24 Hr | 3 Days | 10 Minutes | 24 Hours | 3 Days | 24 Hr | 3 Days |
| 1 | 0 | 0 | 0 | No | 6.4 | 1637 | 1413 | 860 | 492 | −39 | −65 | 967 | 610 | 317 | −37 | −67 |
| 2 | 0 | 0 | 0 | Yes | 6.8 | 1637 | 1500 | 1097 | 726 | −27 | −52 | 1316 | 813 | 520 | −38 | −60 |
| 3 | 0 | 0 | 0 | Yes | 7.0 | 1637 | 1440 | 1143 | 855 | −21 | −41 | 1297 | 867 | 593 | −33 | −54 |
| 4 | 0 | 0 | 0 | Yes | 7.2 | 1637 | 1417 | 1240 | 995 | −12 | −30 | 1117 | 860 | 703 | −23 | −37 |
| 5 | 0 | 0 | 0 | Yes | 7.5 | 1637 | 1320 | 1270 | 1120 | −4 | −15 | 1095 | 967 | 870 | −12 | −21 |
| 6 | 0.06 | 0.31 | 0 | No | 6.4 | 1637 | 1440 | 1260 | — | −13 | — | 1348 | — | — | — | — |

TABLE III-continued

| I.D. # | Sodium Molybdate | Thio urea | Sodium Ferrocyanide | NH to change pH | pH of Final Solution | Initial Viscosity | Viscosity Stability of the Diluted Solutions for Which the Dilutions Were After 7 Days: Viscosity (in cps): 10 Minutes | 24 Hours | 3 Days | Percent Change 10 Minutes to: 24 Hr | 3 Days | Viscosity Stability of the 31 Day Dilutions: Viscosity (in cps): 10 Minutes | 24 Hours | 3 Days | Percent Change 10 Minutes to: 24 Hr | 3 Days |
|---|---|---|---|---|---|---|---|---|---|---|---|---|---|---|---|---|
| 7 | 0.06 | 0.31 | 0 | Yes | 7.0 | 1637 | 1447 | 1353 | — | −6 | — | 1380 | — | — | — | — |
| 8 | 0 | 0.06 | 0 | Yes | 7.0 | 1637 | 1113 | 973 | 803 | −13 | −28 | 880 | 723 | 557 | −18 | −37 |
| 9 | 0 | 0.12 | 0 | Yes | 7.0 | 1637 | 1187 | 1053 | 895 | −11 | −25 | − 990 | 820 | 660 | −17 | −33 |
| 10 | 0 | 0.25 | 0 | Yes | 7.0 | 1637 | 1060 | 1000 | 873 | −6 | −18 | 890 | 740 | 627 | −17 | −30 |
| 11 | 0 | 0.50 | 0 | Yes | 7.0 | 1637 | — | — | — | — | — | 1250 | 1166 | 940 | −7 | −25 |
| 12 | 0 | 0 | 0.06 | Yes | 7.0 | 1637 | 1310 | 1020 | 705 | −22 | −46 | 977 | 707 | 477 | −28 | −51 |
| 13 | 0 | 0 | 0.12 | Yes | 7.0 | 1637 | 1480 | 1217 | 850 | −18 | −43 | 1238 | 940 | — | −24 | — |
| 14 | 0 | 0 | 0.25 | Yes | 7.0 | 1637 | 1280 | 1180 | 932 | −8 | −27 | 1128 | 1070 | — | −5 | — |
| 19 | same as #1 except Galactosol 211 is used as thickener instead of E9 | | | | 6.4 | 952 | 1073 | 870 | 557 | −19 | −43 | 898 | 710 | — | −21 | — |

(1)The samples evaluating hyrogen peroxide effect are eliminated as no viscosity stability data was taken.

EXAMPLE 7

Two thickener-free, low quality liquid concentrate samples were obtained. One of the samples was filtered in an effort to eliminate impurities. Analysis of the unfiltered sample (Sample 1) indicated that it contained by weight 23.59% $P_2O_5$, 8.77% $NH_3$, 2.47% $SO_4$ and 100 ppm $Fe^{+2}$, had a pH of 6.50, had a specific gravity of 1.292 kilograms per liter and had a nitrogen to phosphorus molar ratio of 1.55. Analysis of the filtered sample (Sample 2) indicated that it contained by weight 23.39% $P_2O_5$, 8.42% $NH_3$, 1.23% $SO_4$ and 89 ppm $Fe^{+2}$, had a pH of 6.38, had a specific gravity of 1.266 kilograms per liter and had a nitrogen to phosphorus molar ratio of 1.50. The analyses, therefore, indicated that the samples were about 40% by weight mono and diammonium phosphate in 1:1 molar ratio. The unfiltered sample was greenish brown, the filtered sample was yellow and both samples contained considerable quantities of fine, nearly colloidal insolubles. It appeared that the samples were prepared from wet-acid grade phosphoric acid.

A third sample (Sample 3) was prepared by dissolving dry solid, particulate DAP (1 kg.) in distilled water (1.34 liters). The third sample contained 23.13% by weight $P_2O_5$ and had a ph of 6.80.

The samples were each diluted and mixed with other components to adjust the complete liquid concentrate formulation to a 40% solids containing solution of 18.53% $P_2O_5$, thereby forming mixtures of the following contents (concentrations shown in weight percent):

| Component | Adjusted Sample 1 | Adjusted Sample 2 | Adjusted Sample 3 |
|---|---|---|---|
| Sample | 80.67 | 80.11 | 80.11 |
| Added Water | 14.29 | 14.85 | 14.85 |
| Hydroxypropyl guar | 3.06 | 3.06 | 3.06 |
| Sodium silicofluoride | 0.92 | 0.92 | 0.92 |
| Sodium thiosulfate | 0.31 | 0.31 | 0.31 |
| Thiotax MBT | 0.12 | 0.12 | 0.12 |
| Fugitive Color | 0.55 | 0.55 | 0.55 |
| Pluronic | 0.08 | 0.08 | 0.08 |

To study various methods of ammeliorating the deleterious effects of impurities, further samples were prepared by adding ammonia to aliquots of the above samples to adjust the pH to the levels indicated in the tables below.

All samples were stored for 531 days at 23.3° C. Periodically during the first 74 days the samples were stirred to assure homogeneity and an aliquot removed and diluted to end-use concentration by mixing the aliquot (80 gm.) with water (191 gm.) and stirring for five minutes. The viscosity of the diluted samples was measured ten minutes and 24 hours after dilution. Viscosity was determined at ambient temperature with a Model LVF Brookfield viscometer fitted with a No. 4 spindle rotating at 60 rpm. A final dilution and viscosity measurement was made 513 days after initial preparation of the sample. The following table illustrates the viscosity measured for the undiluted samples over time:

| Sample | pH | Sample Viscosity (cps) after storage for (days): 0 | 1 | 12 | 25 | 47 | 74 | 513 |
|---|---|---|---|---|---|---|---|---|
| Unfiltered | 6.6 | 130 | 47 | 97 | 80 | 100 | 87 | below 100 |
| Unfiltered | 7.1 | 128 | 80 | 103 | 100 | 132 | 115 | below 100 |
| Filtered | 6.4 | 53 | 200 | 153 | 103 | 128 | 90 | below 100 |
| Filtered | 6.9 | 73 | 130 | 150 | 90 | 117 | 97 | below 100 |
| #3 (DAP) | 7.8 | 80 | 130 | 130 | 80 | 130 | 110 | below 100 |

The following table illustrates the 10 minute viscosity of the aliquots removed from the above described concentrates and diluted to a final end use concentration.

| Sample | pH | Sample Viscosity (cps) after storage for (days): 0 | 1 | 12 | 25 | 47 | 74 | 513 |
|---|---|---|---|---|---|---|---|---|
| Unfiltered | 6.6 | 1550 | 1523 | 1610 | 1201 | 940 | 864 | 547 |
| Unfiltered | 7.1 | 1550 | 1607 | 1433 | 1270 | 1127 | 970 | 690 |
| Filtered | 6.4 | 1543 | 1393 | 1243 | 1055 | 850 | 605 | 340 |
| Filtered | 6.9 | 1543 | 1477 | 1323 | 1032 | 1008 | 827 | 550 |
| #3 (DAP) | 7.8 | 1570 | 1583 | 1607 | 1544 | 1485 | 1450 | 1190 |

In view of the above, it will be seen that the several objects of the invention are achieved and other advantageous results attained.

What is claimed is:

1. An aqueous concentrate that is adapted to be diluted with water to produce an aqueous fire retardant mixture exhibiting a viscosity of between about 1000 centipoise and about 2000 centipoise and containing between about 5% and about 20% by weight fire retardant and between about 0.2% and about 3% by weight thickening agent, the concentrate exhibiting a viscosity of less than about 50 centipoise and containing at least about 24% by weight of the fire retardant and at least about 1.5% by weight of a thickening agent, the characteristics of said fire retardant being such that (a) the fire retardant in solid form releases phosphoric acid or sulfuric acid or both at a temperature below the ignition temperature of cellulose; and (b) mixing of one part by weight said fire retardant with between about 6 and about 20 parts by weight water and between about 0.055 and about 0.2 parts by weight of the thickening agent produces a mixture having a viscosity of between about 1000 and about 2000 centipoise; but (c) mixing of one part by weight of said fire retardant with less than about 4 parts by weight water and between about 0.055 and about 0.2 parts by weight of the thickenng agent produces a mixture having a viscosity less than 1000 centipoise.

2. A concentrate as set forth in claim 1 wherein the fire retardant is selected from the group consisting of monoammonium orthophosphate, diammonium orthophosphate, monoammonium pyrophosphate, diammonium pyrophosphate, triammonium pyrophosphate, tetraammonium pyrophosphate, ammonium polyphosphate, substituted ammonium polyphosphate, amide polyphosphate, melamine polyphosphate, ammonium-alkali metal mixed salts of orthophosphate, ammonium-alkali metal mixed salts of pyrophosphate, ammonium-alkali metal mixed salts of polyphosphate, ammonium-alkaline earth metal mixed salts of orthophosphate, ammonium-alkaline earth metal mixed salts of pyrophosphate, ammonium-alkaline earth metal mixed salts of polyphosphate, ammonium sulfate, liquid polyammonium phosphate and blends thereof.

3. An aqueous concentrate that is adapted to be diluted with water to produce a fire retardant mixture exhibiting a viscosity of between about 50 centipoise and about 250 centipoise and containing between about 5% and about 20% by weight fire retardant and between about 0.2% and about 3% by weight thickening agent, the concentrate exhibiting a viscosity of less than about 50 centipoise and containing at least about 24% by weight of the fire retardant and at least about 0.75% by weight of a thickening agent, the characteristics of said fire retardant being such that (a) the fire retardant in solid form releases phosphoric acid or sulfuric acid or both at a temperature below the ignition temperature of cellulose; and (b) mixing of one part by weight said fire retardant with between about 6 and about 20 parts by weight water and between about 0.02 and about 0.075 parts by weight of the thickening agent produces a mixture having a viscosity of between about 50 and about 250 centipoise; but (c) mixing of one part by weight of said fire retardant with less than about 4 parts by weight water and between about 0.02 and about 0.075 parts by weight of the thickening agent produces a mixture having a viscosity less than 50 centipoise.

4. A concentrate as set forth in claim 3 wherein said fire retardant is selected from the group consisting of monoammonium orthophosphate, diammonium orthophosphate, monoammonium pyrophosphate, diammonium pyrophosphate, triammonium pyrophosphate, tetraammonium pyrophosphate, ammonium polyphosphate, substituted ammonium polyphosphate, amide polyphosphate, melamine polyphosphate, ammonium-alkali metal mixed salts of orthophosphate, ammonium-alkali metal mixed salts of pyrophosphate, ammonium-alkali metal mixed salts of polyphosphate, ammonium-alkaline earth metal mixed salts of orthophosphate, ammonium-alkaline earth metal mixed salts of pyrophosphate, ammonium-alkaline earth metal mixed salts of polyphosphate, ammonium sulfate, liquid polyammonium phosphate and blends thereof.

* * * * *